May 21, 1957     H. BAUMANN     2,793,019
GAS TURBINE INSTALLATION FOR THE GENERATION
OF HOT COMPRESSED AIR
Filed Aug. 21, 1952
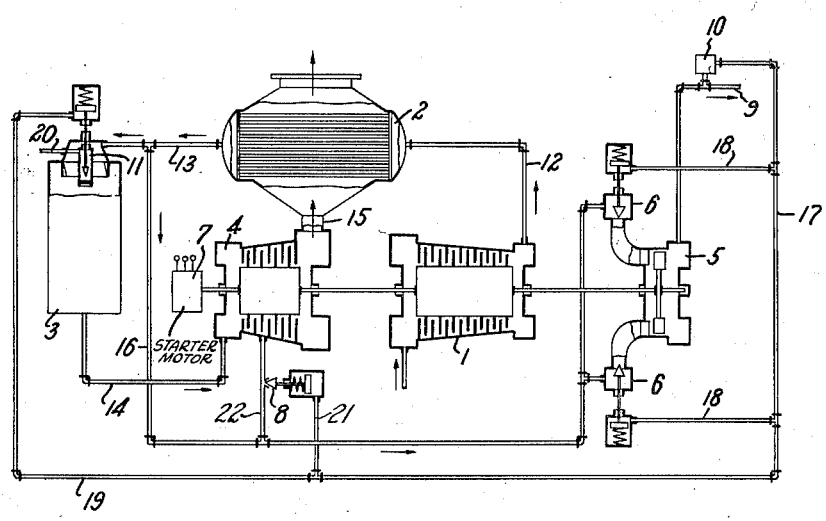
INVENTOR
Hans Baumann
BY Pierce, Scheffler + Parker
ATTORNEYS

United States Patent Office 2,793,019
Patented May 21, 1957

2,793,019

GAS TURBINE INSTALLATION FOR THE GENERATION OF HOT COMPRESSED AIR

Hans Baumann, Baden, Switzerland, assignor to Aktiengesellschaft Brown, Boveri & Cie, Baden, Switzerland, a joint-stock company Application August 21, 1952, Serial No. 305,673

Claims priority, application Switzerland September 6, 1951

1 Claim. (Cl. 263—19)

This invention relates to a gas turbine installation for the generation of hot compressed air. It is characterized by a combination in which an expansion turbine of variable capacity transfers its power output to the shaft of a compressor and in which the entire quantity of air derived from the compressor is expanded to the desired pressure after it has been heated by heat exchange with the waste gases of a gas turbine.

The accompanying drawing diagrammatically illustrates the invention in a one-stage gas turbine installation.

In the drawing: 1 is an air compressor, 2 is an air preheater, 3 is a combustion chamber and 4 is a gas turbine. These parts are connected together in the order stated by conduits 12, 13 and 14. In addition, the gas outlet of the gas turbine is connected with the gas inlet of the air preheater by conduit 15.

A further conduit 16 connects the air outlet of the air preheater 2 with an expansion turbine 5 which is provided with means for regulating the quantity of air flowing through it and therefore serves as a means for the regulation of the total useful air derived from the compressor. The turbine 5 may be provided, for example, with adjustable guide vanes or, as shown in the drawing, with nozzle valves 6. It transfers its output to the shaft of the compressor group 1, 4. 7 is a starter motor.

In order to avoid pumping of the compressor 1 during regulating operations in which the capacity of the expansion turbine 5 is greatly reduced, there is provided a conduit 22 controlled by regulating valve 8 for allowing air to flow directly from the preheater into the compressor drive gas turbine 4. Oil line 17 is connected by branches 18, 19 and 21 to operating means for valves 6, 11 and 8 respectively. 20 is a fuel inlet to the combustion chamber and is controlled by valve 11.

After having passed through the expansion turbine 5, the air is taken from the installation at 9 as hot compressed air. It can be used as such in any compressed air consumer, for example, in a chemical plant or as blast furnace air. The regulation of the installation is effected by means of a pressure or quantity meter 10 which gives the regulating impulse through the oil line 17 and branches 18, 19 and 21 for the actuation of the nozzle valve 6 of the expansion turbine, the regulating valve 8 of the line 16, 22, and of the fuel regulating valve 11 in the fuel supply line of the combustion chamber.

The use of an expansion turbine which normally is traversed by the entire quantity of air heated in an air preheater in a gas turbine installation according to the invention affords many advantages. The heating of the air in the air preheater is moderate, for example, from 200 to 350° C. Accordingly, the regulating means of the expansion turbine are not highly stressed by the heat and that can well withstand rapid and frequent regulating operations. As a result of the indirect heating of the air, there is also no danger of fouling up the regulating means, this being essential especially when adjustable guide vanes are used. The indirect heating of the air replaces the use of a combustion chamber in the compressed air line. This eliminates difficulties which the extinguishing and igniting of this combustion chamber would cause during regulating operations. The pressure ratio of the gas turbine can be freely selected independently of the desired pressure of the air, according to purely thermodynamic principles. The expansion turbine takes care of the equalization of the pressures. By using the excess heat contained in the air, a reduction of the fuel consumption of the entire installation is achieved by the concomitant heating of the air in the preheater. Since all of the air passes through the preheater, the weight of the air heated therein is greater than the weight of the waste gases of the gas turbine affecting the heating. This fact, the air preheater being the same in other respects, enables a greater lowering of the waste gas temperature and hence an improvement of the heat economy of the total installation. Due to the fact that at variable capacity the expansion turbine transfers its power output to the shaft of the compressor, it is possible to equalize differences in the output of the gas turbine and in the output of the air compressor occurring during deviations from the normal output. This makes it possible, at an air requirement varying over a wide range, to operate the gas turbine, which runs at a variable speed, at the maximum temperature of the combustion gases permissible for it and thus to obtain good partial-load efficiencies of the installation. By variation of the capacity of the expansion turbine, finally, also the speed of rotation and hence the delivery of the air compressor can be varied very rapidly, whereby a good adaptation of the installation to highly variable air requirements, as they occur for instance in steel plant practice, is obtained.

I claim:

A gas turbine installation for the generation of hot compressed air comprising an air compressor having an air inlet and an outlet; a heat exchanger having inlets and outlets for air and gas, the air inlet being connected to the outlet of said air compressor; a combustion chamber having an air inlet connected to the air outlet of said heat exchanger, a fuel inlet, and an outlet for the combustion gas; means for supplying fuel to said combustion chamber; a pressure controlled valve controlling the supply of fuel to said combustion chamber; a gas turbine having a gas inlet connected to the gas outlet of said combustion chamber, a gas outlet connected to the gas inlet of the heat exchanger, and an air inlet; said turbine being mechanically connected to said air compressor; a variable capacity expansion turbine having an air inlet and an air outlet, said expansion turbine being mechanically connected to drive said air compressor; a first conduit for delivering air directly from the air outlet of said heat exchanger to the air inlet of said expansion turbine; a pressure controlled valve in said first conduit controlling the flow of air from the heat exchanger to the expansion turbine; a second conduit for delivering air directly from the heat exchanger to the gas turbine; a pressure controlled valve in said second conduit for controlling the flow of air from the heat exchanger to the gas turbine; and a flow regulator connected in the air output of the expansion turbine, said flow regulator being connected to control the operation of said pressure controlled valves in response to the pressure of the compressed air output of said expansion turbine.

References Cited in the file of this patent

UNITED STATES PATENTS

| | | |
|---|---|---|
| 2,253,809 | Pfenninger | Aug. 26, 1941 |
| 2,298,663 | Traupel | Oct. 13, 1942 |
| 2,401,285 | Woodward | May 28, 1946 |
| 2,461,186 | Seippel | Feb. 8, 1949 |
| 2,477,184 | Imbert et al. | July 26, 1949 |
| 2,489,939 | Traupel | Nov. 29, 1949 |
| 2,618,470 | Brown | Nov. 18, 1952 |